(12) United States Patent
Zheng et al.

(10) Patent No.: US 12,179,364 B2
(45) Date of Patent: Dec. 31, 2024

(54) MOTION TRAJECTORY PLANNING METHOD FOR ROBOTIC MANIPULATOR, ROBOTIC MANIPULATOR AND COMPUTER-READABLE STORAGE MEDIUM

(71) Applicant: UBTECH ROBOTICS CORP LTD, Shenzhen (CN)

(72) Inventors: Dake Zheng, Shenzhen (CN); Yizhang Liu, Shenzhen (CN); Jianxin Pang, Shenzhen (CN); Huan Tan, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 400 days.

(21) Appl. No.: 17/566,726

(22) Filed: Dec. 31, 2021

(65) Prior Publication Data

US 2022/0184808 A1 Jun. 16, 2022

Related U.S. Application Data

(63) Continuation of application No. PCT/CN2020/135084, filed on Dec. 10, 2020.

(51) Int. Cl.
*B25J 9/16* (2006.01)

(52) U.S. Cl.
CPC .......... *B25J 9/1664* (2013.01); *B25J 9/1605* (2013.01); *B25J 9/1697* (2013.01)

(58) Field of Classification Search
CPC ....... B25J 9/1664; B25J 9/1605; B25J 9/1697
See application file for complete search history.

(56) References Cited

U.S. PATENT DOCUMENTS

| | | | | |
|---|---|---|---|---|
| 9,486,918 | B1* | 11/2016 | Earl | B25J 9/163 |
| 11,016,491 | B1* | 5/2021 | Millard | G06N 3/045 |
| 2019/0240833 | A1* | 8/2019 | Kimura | B25J 9/1664 |
| 2020/0086437 | A1* | 3/2020 | Johnson | B25J 9/1674 |

(Continued)

FOREIGN PATENT DOCUMENTS

| | | | | |
|---|---|---|---|---|
| CN | 107214701 | A | 9/2017 | |
| CN | 107214701 | B * | 10/2019 | B25J 9/1666 |
| CN | 111958584 | A | 11/2020 | |

OTHER PUBLICATIONS

ISR for PCT/CN2020/135084.
Written opinions of ISA for PCT/CN2020/135084.

*Primary Examiner* — Khoi H Tran
*Assistant Examiner* — Tristan J Greiner (57) ABSTRACT

A motion trajectory planning method for a robotic manipulator having a visual inspection system, includes: in response to a command instruction, obtaining environmental data collected by the visual inspection system; determining an initial DS model motion trajectory of the robotic manipulator according to the command instruction, the environmental data, and a preset teaching motion DS model library, wherein the teaching motion DS model library includes at least one DS model motion trajectory generated based on human teaching activities; and at least based on a result of determining whether there is an obstacle, whose pose is on the initial DS model motion trajectory, in a first object included in the environmental data, correcting the initial DS model motion trajectory to obtain a desired motion trajectory of the robotic manipulator.

20 Claims, 6 Drawing Sheets

(56) References Cited

U.S. PATENT DOCUMENTS

| | | | |
|---|---|---|---|
| 2020/0225673 A1* | 7/2020 | Ebrahimi Afrouzi | G06N 5/04 |
| 2021/0402593 A1* | 12/2021 | Wake | G06V 40/28 |
| 2022/0016780 A1* | 1/2022 | McDaniel | B25J 9/1666 |

* cited by examiner

MOTION TRAJECTORY PLANNING METHOD FOR ROBOTIC MANIPULATOR, ROBOTIC MANIPULATOR AND COMPUTER-READABLE STORAGE MEDIUM

CROSS REFERENCE TO RELATED APPLICATIONS

The present application is a continuation-application of International Application PCT/CN2020/135084, with an international filing date of Dec. 10, 2020, the contents of all of which are hereby incorporated by reference.

BACKGROUND

1. Technical Field

The present disclosure generally relates to robotic manipulators, and particularly to a motion trajectory planning method for a robotic manipulator and a robotic manipulator.

2. Description of Related Art

With the rapid development of technologies, robotic manipulators have become more and more mature. Robotic manipulators have been greatly improved and maturely applied in areas such as unmanned handling, logistics sorting, and assembly line manufacturing. However, there is still a long way to go for improvement and applications in areas such as elderly care, assistance for the people in need, family services, human-machine collaboration, and autonomous operations of complex unknown scenarios. For the above-mentioned complex areas, some conventional robotic manipulators lack sufficient capabilities to plan the motion trajectory autonomously and flexibly.

Therefore, there is a need to provide a method and robotic manipulator to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
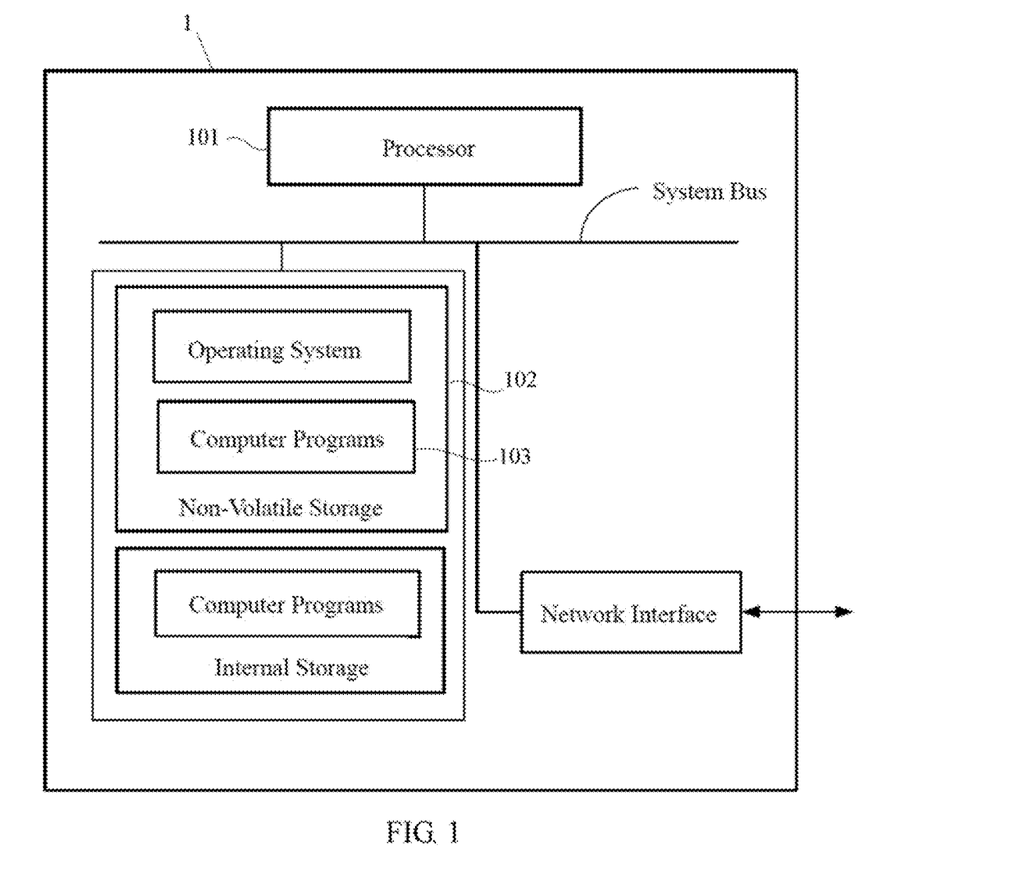
FIG. 1 is a schematic block diagram of a device for recognizing a hand gesture according to one embodiment.

FIG. 1 shows a schematic block diagram of a robotic manipulator 1 according to one embodiment. The robotic manipulator 1 may include a processor 101, a storage 102, and one or more executable computer programs 103 that are stored in the storage 102. The processor 101 is electrically connected to the storage 102, and performs corresponding operations by executing the executable computer programs 103 stored in the storage 102. When the processor 101 executes the computer programs 103, the steps in the embodiments of the method for controlling the robotic manipulator 1, such as steps S101 to S103 in FIG. 2, steps S201 to S205 in FIG. 3, and steps S301 to S302 in FIG. 4 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robotic manipulator 1, such as a hard disk or a memory. The storage 102 may also be an external storage device of the robotic manipulator 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robotic manipulator 1. The storage 102 can also be used to temporarily store data that have been output or is about to be output.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robotic manipulator 1.

Figure 2:
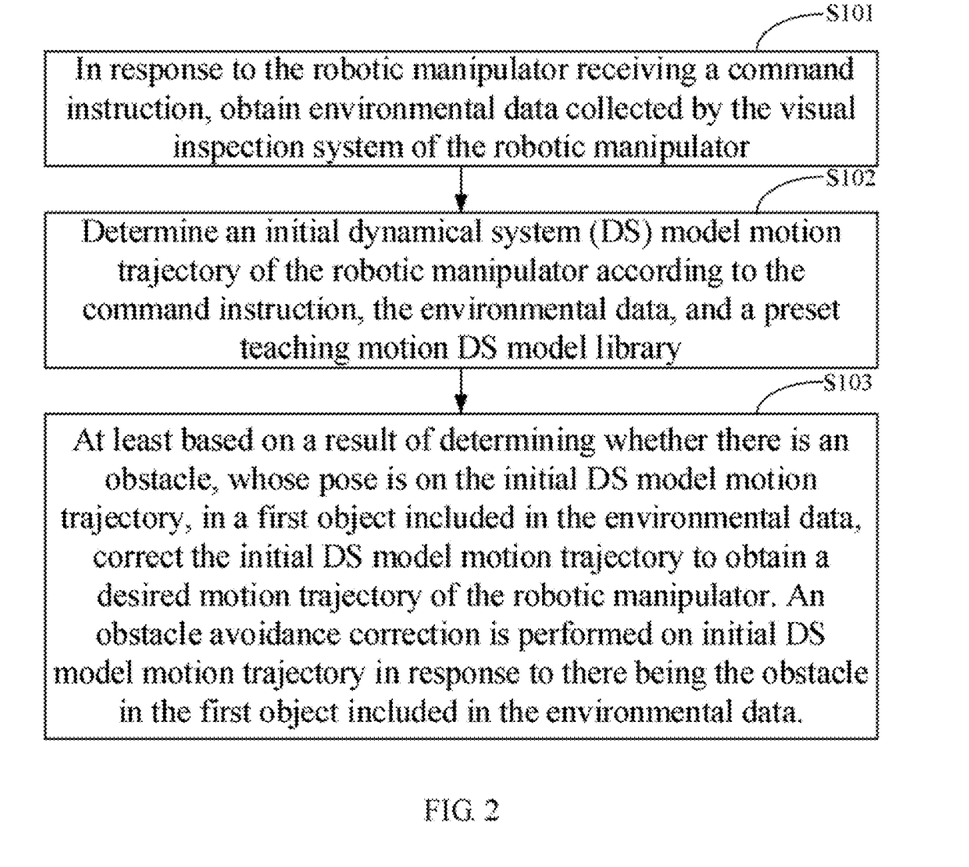
FIG. 2 is a schematic flowchart of a motion trajectory planning method according to one embodiment.

FIG. 2 shows an exemplary flowchart of a motion trajectory planning method according to one embodiment. The method can be implemented to control the robotic manipulator 1 shown in FIG. 1. In one embodiment, the method may include steps S101 to S103.

Step S101: In response to the robotic manipulator receiving a command instruction, obtain environmental data collected by the visual inspection system of the robotic manipulator.

In one embodiment, the above-mentioned method for planning the motion trajectory can be implemented by a motion trajectory planning module of the robotic manipulator. The motion trajectory planning module can be a program module that is stored in the computer-readable storage medium of the robotic manipulator. The processor of the robotic manipulator can execute the program module to implement the above-mentioned method for planning the motion trajectory of the robotic manipulator.

A user or device can send command instructions to the robotic manipulator. The command instructions can be voice or non-voice command instructions. For example, a voice processing module of the robotic manipulator may collect and process voice commands from a user, and generate command instructions. In another example, the robotic manipulator can receive command instructions sent by other users or devices through a network.

In one embodiment, the visual detection system of the robotic manipulator can detect environmental data in the working space of the robotic manipulator. The visual detection system may include a camera, and the above-mentioned environmental data can be obtained by capturing images by the camera. For example, if there is a water cup in the working space of the robotic manipulator, the image containing the water cup can be captured by the camera of the visual inspection system.

Step S102: Determine an initial dynamical system (DS) model motion trajectory of the robotic manipulator according to the command instruction, the environmental data, and a preset teaching motion DS model library. The teaching motion DS model library includes at least one DS model motion trajectory generated based on human teaching activities.

Step S103: At least based on a result of determining whether there is an obstacle, whose pose is on the initial DS model motion trajectory, in a first object included in the environmental data, correct the initial DS model motion trajectory to obtain a desired motion trajectory of the robotic manipulator. An obstacle avoidance correction is performed on initial DS model motion trajectory in response to there being the obstacle in the first object included in the environmental data.

The motion trajectory of the robotic manipulator refers to the motion trajectory of the movable end of the robotic manipulator. The motion trajectory of the robotic manipulator can be described based on the DS principle. DS is a mathematical concept. There is a fixed rule in the DS system that describes the evolution of a point in geometric space over time. Therefore, the motion trajectory of the movable end of the robotic manipulator, which can be regarded as a point, can be described by the DS principle.

In one embodiment, a teaching motion DS model library is created in advance. The teaching motion DS model library contains at least the DS model motion trajectories generated based on the human teaching activities. Human teaching activities refer to the use of a human arm to complete a task. The task can include one action or multiple actions. One exemplary human teaching activity can include: raising an arm, lowering the arm, picking up the cup, opening the refrigerator door. A person performing a teaching activity can demonstrate the operations of "raise an arm", "lowering the arm", "pick up the cup" and "opening the refrigerator door," which can be captured by a camera to obtain the video data of the person demonstrating the actions above. Based on the DS principle, the positions of the end of the arm in the video data are determined, and the trajectory of the end of the arm during the actions above is obtained. The arm of the above-mentioned person corresponds to the robotic manipulator, and the hand of the arm is the end of the arm, and corresponds to the end of the robotic manipulator. The robotic manipulator can imitate the arm of the above-mentioned person to perform the same tasks. That is, the motion trajectory of the end of the arm obtained based on the DS principle can be used as the DS model motion trajectory of the robotic manipulator. Therefore, based on the motion trajectory, the DS model motion trajectory corresponding to the corresponding action can be obtained. In this way, the above-mentioned teaching motion DS model library can be obtained. The robotic manipulator can thus perform tasks by imitating human actions, so as to have the ability to determine the motion trajectory autonomously and flexibly, which improves the autonomy and flexibility of the robotic manipulator.

It should be noted that different teaching motion DS model libraries can be created for different scenarios. For example, in a home scenario, a person can teach and demonstrate possible actions at home, and a teaching motion DS model library corresponding to the home scenario can be created based on the actions taught by the person. In practical applications, different teaching motion DS model libraries can be crated according to specific scenarios and needs.

In the embodiment of the present disclosure, the initial DS model motion trajectory of the robotic manipulator can be determined according to the command instruction, the environmental data, and the aforementioned preset teaching motion DS model library. Although the teaching motion DS model library is actually equivalent to a template library, it is still different from the real activities of the robotic manipulator. For example, obstacle avoidance needs to be performed when there may be obstacles, or the terminating position of the task may be different. Therefore, after the initial DS model motion trajectory is obtained, it may need to be corrected to obtain the desired motion trajectory of the manipulator.

It should be noted that after obtaining the above-mentioned desired motion trajectory, the robotic manipulator can be tracked and controlled, so that the robotic manipulator can accurately track the desired motion trajectory to complete the tasks indicated by the above-mentioned command instruction, thereby realizing the human-like autonomous movement of the robotic manipulator.

In the embodiment of the present disclosure, based on human teaching activities, DS model motion trajectories can be generated, and the teaching motion DS model library can be created, which allows the robotic manipulator to determine the initial DS model motion trajectory based on the teaching motion DS model library. The initial DS model motion trajectory may be corrected to obtain the desired motion trajectory that meets the requirements of the command instruction, thereby realizing the autonomous and flexible motion trajectory planning of the manipulator.

Figure 3:
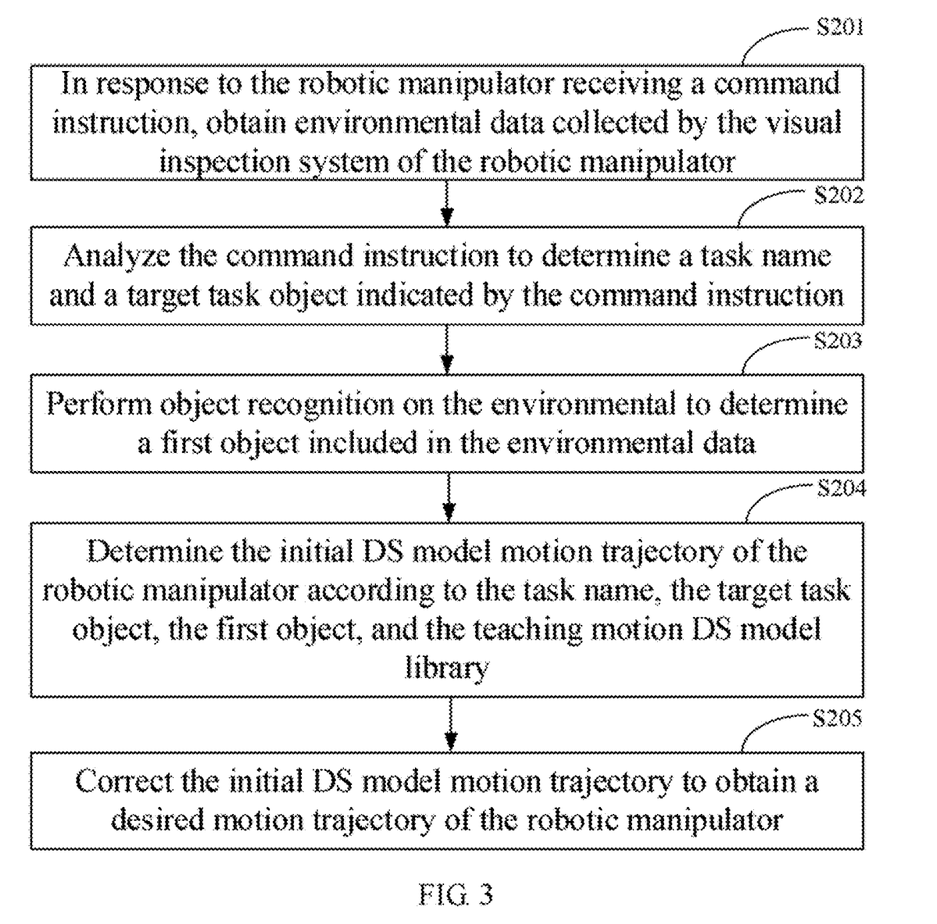
FIG. 3 is a schematic flowchart of a motion trajectory planning method according to another embodiment.
Figure 4:
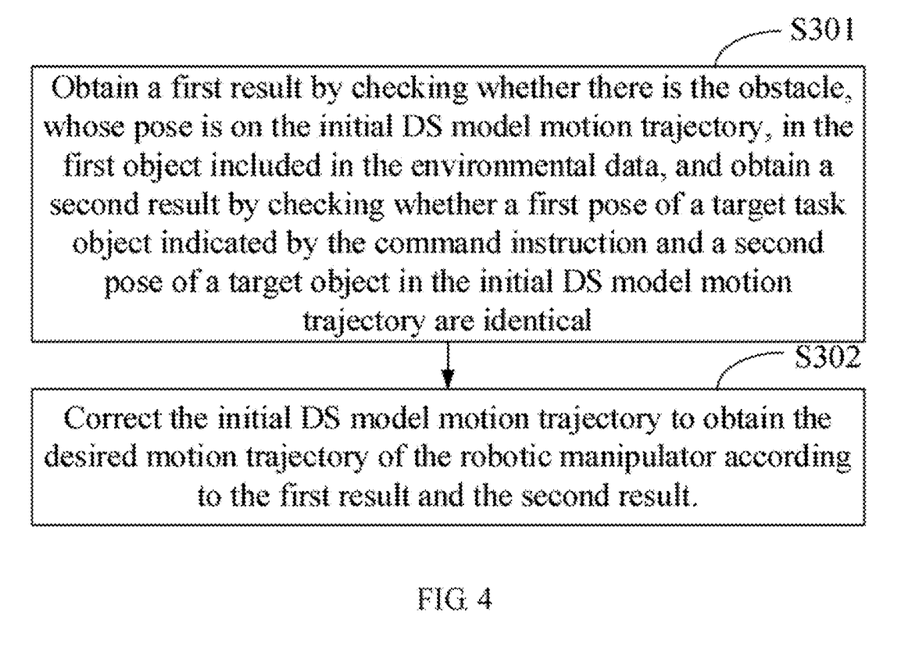
FIG. 4 is a schematic flowchart of a method for correcting an initial DS model motion trajectory according to one embodiment.

Referring to FIG. 3, in another embodiment, a motion trajectory planning method may include the following steps.

Step S201: In response to the robotic manipulator receiving a command instruction, obtain environmental data collected by the visual inspection system of the robotic manipulator.

The foregoing step S201 is similar to the step S101 in the embodiment of FIG. 1. For details, please refer to the related content of step S101, which will not be repeated here.

Step S202: Analyze the command instruction to determine a task name and a target task object indicated by the command instruction. The target task object is an object manipulated by the robotic manipulator when the command instruction is executed.

Step S203: Perform object recognition on the environmental to determine a first object included in the environmental data.

Step S204: Determine the initial DS model motion trajectory of the robotic manipulator according to the task name, the target task object, the first object, and the teaching motion DS model library.

In one embodiment, the teaching motion DS model library may include relationships between the task name, the task object, and the initial DS model motion trajectory. When obtaining the DS model motion trajectory based on human teaching movement, the task object and task name will also be recorded. For example, the task name can be "picking up", and the task object can be "water glass," "bottle," "scissors," "cell phone," etc. The command instructions can be: "picking up the water glass", "picking up the bottle", "picking up the scissors", "pick up the cell phone." It should be noted that in certain scenarios the task object can be omitted in the teaching motion DS model library. That is, the task performed by the robotic manipulator can be the actions of the manipulator, which has nothing to do with external objects. For example, the task name can be "raising hand", "pointing to the front", etc., which does not involve manipulation of objects. In practical applications, whether the task object is omitted depends on a specific task, which can be performed according to actual needs.

In one embodiment, the DS model motion trajectory in the teaching motion DS model library may be obtained as followed: Obtain the video data of human teaching activities corresponding to task A, and process the video data to obtain the DS model motion trajectory corresponding to task A using the Gaussian mixture model-based teaching motion DS model identification method. Upon analysis of task A, the task name and task object of the DS model motion trajectory may be set.

In one embodiment, after a command instruction is received and the environmental data is obtained, the command instruction can be parsed to determine the target task name and target task object indicated by the command instruction. The target task object refers to an object manipulated by the robotic manipulator when the command instruction is executed. For example, if the command instruction is "picking up water cup", the target task name can be "picking up" and the target task object is "water cup."

In one embodiment, if the above-mentioned command instruction is a non-voice command, the information contained in the command instruction can be obtained, and the target task name and target task object in the information can be determined. For example, a user may input a task on the display interface of a device that can communicate with the robotic manipulator, such as "open the refrigerator," and the device may generate a corresponding command instruction, and sends the command instruction to the robotic manipulator via the network. The robotic manipulator will analyze the command instruction, and can determine that the target task name is "open" and the target task object is "refrigerator".

In another embodiment, if the command instruction is a voice command, voice recognition will be performed on the voice command to determine the text content contained in the voice command. The text content will be further divided into keywords, and then the target task name and target task object mentioned above are determined based on the keywords.

Further, object recognition will be performed on the environmental data to determine a first object included in the environmental data. The above-mentioned first object refers to all objects existing in the image included in the environmental data.

In one embodiment, the initial DS model motion trajectory of the robotic manipulator is determined according to the task name, the target task object, the first object, and the teaching motion DS model library. Since the teaching motion DS model library contains the task name, task object and DS model motion trajectory, the above-mentioned initial DS model motion trajectory can be obtained as follows:

Step A: Determine whether the first object contains the target task object.

Step B: In response to the first object containing the target task object, search in the teaching motion DS model library using the task name and the target task object as keywords to determine the initial DS model motion trajectory of the robotic manipulator associated with the task name and the target task object.

In one embodiment, when determining whether the first object contains the target task object, if the target task object is not omitted in the teaching motion DS model library, traversing is performed to search in the first object. After the traversing is completed, the second object that is the same as the target task object among the traversed objects is determined, and then the second object is determined to be the target task object. For example, if the first object includes: a water cup, scissors, a pen, and a notebook, and the target task object is a "water cup", a traversing is performed to search in these objects to determine whether the target task object "water cup" is included in these objects. It should be noted that when the target task object is omitted in the teaching motion DS model library, it can also be determined that the first object contains the target task object.

After that, a search is performed in the teaching motion DS model library using the task name and the target task object as keywords to determine the initial DS model motion trajectory of the robotic manipulator associated with the task name and the target task object.

In one embodiment, the task indicated by a command instruction can be composed of multiple subtasks. For example, if the task is "open the refrigerator", the task can be divided into two steps to perform. Specifically, the first one is to move to the refrigerator door, and its corresponding target task name is "moving to position", the target task object is "refrigerator." The other is to perform the opening action, the corresponding target task name is "open," and the target task object is "refrigerator." In this case, it needs to obtain the initial DS model motion trajectories corresponding to the two steps, and use the initial DS model motion trajectories of the two steps as the motion trajectories of the task indicated by the command instruction. In practical applications, how the task is divided depends on actual situations, and the task size corresponding to the motion trajectory of each DS model in the teaching motion DS model library can be set according to the needs, which is not limited here.

Step S205: Correct the initial DS model motion trajectory to obtain a desired motion trajectory of the robotic manipulator.

In the embodiment of the present disclosure, by using the task name and the target task object to search in the teaching motion DS model library, it can effectively determine the initial DS model motion trajectory corresponding to the task name and the target task object.

Referring to FIG. 4, in one embodiment, the step S103 of FIG. 1 may include the following steps.

Step S301: Obtain a first result by checking whether there is the obstacle, whose pose is on the initial DS model motion trajectory, in the first object included in the environmental data, and obtain a second result by checking whether a first pose of a target task object indicated by the command instruction and a second pose of a target object in the initial DS model motion trajectory are identical.

Step S302: Correct the initial DS model motion trajectory to obtain the desired motion trajectory of the robotic manipulator according to the first result and the second result.

In the embodiment, after the initial DS model motion trajectory is obtained, it will be corrected so that the desired motion trajectory obtained after the correction can be more in line with the trajectory required by the robotic manipulator to execute the command instruction in the actual scenarios.

Specifically, it can be determined whether there is the obstacle, whose pose is on the initial DS model motion trajectory, in the first object included in the environmental data, so as to determine whether obstacle avoidance processing is required.

In one embodiment, object recognition can be performed on the environmental data to determine the first object included in the environmental data. In addition to determining whether there is a target task object, it is also used to determine whether there is an obstacle. The manipulator can determine the pose of the first object included in the environmental data. The pose and the DS model motion trajectory are determined based on the same Cartesian coordinate system.

The first result may be "no" that means no obstacle exists, or may be "yes" that means there is an obstacle existing in the first object included in the environmental data. Further processing may be performed to recognize the obstacle such that the robotic manipulator can "know" what the obstacle is. The obstacle checking may be performed in real time, that is, it is determined in real time whether there is an obstacle at the position that the end of the robotic manipulator is about to reach on the moving track of the end of the robotic manipulator.

The second result may be "yes" that means that the first pose of the target task object indicated by the command instruction and the second pose of the target object in the initial DS model motion trajectory are identical, or may be "no" that means that the first pose and the second pose are not identical. The target object in the initial DS model motion trajectory refers to the object involved in the human teaching activities. For example, if a human teaching activity is "pick up the water glass", the target object is the water glass.

In response to there being the obstacle in the first object included in the environmental data and the first pose and the second pose being identical, the obstacle avoidance correction will be performed on initial DS model motion trajectory to obtain the desired motion trajectory of the robotic manipulator.

In response to there being the obstacle in the first object included in the environmental data and the first pose and the second pose not being identical, the obstacle avoidance correction will be performed on initial DS model motion trajectory, and correction of the second pose of the target object will be performed on the initial DS model motion trajectory after the obstacle avoidance correction based on the first pose, to obtain the desired motion trajectory of the robotic manipulator.

In response to there not being the obstacle in the first object included in the environmental data and the first pose and the second pose being identical, the initial DS model motion trajectory of the robotic manipulator will be determined as the desired motion trajectory of the robotic manipulator.

In response to there not being the obstacle in the first object included in the environmental data and the first pose and the second pose not being identical, correction of the second pose of the target object will be performed on the initial DS model motion trajectory based on the first pose to desired motion trajectory of the robotic manipulator.

In one embodiment, the above-mentioned obstacle avoidance correction on the initial DS model motion trajectory may first determine whether the obstacle is a concave obstacle or a convex obstacle based on the shape of the obstacle. Here, a concave obstacle refers to an object whose shape can be divided into at least two parts by the tangent lines to the outer edges of the contours of the object. Obstacles other than the concave obstacles can be called convex obstacles.

When the obstacle is a concave obstacle, the concave obstacle will be divided into at least two convex obstacles that intersect each other. At least one intersection curve is formed between the at least two convex obstacles intersecting each other.

In response to an intersection of the initial DS model motion trajectory and the concave obstacle not located on the at least one intersection curve, a combined modal matrix formed by the at least two convex obstacles will be calculated, and the initial DS model motion trajectory will be corrected using the combined modal matrix.

In response to an intersection of the initial DS model motion trajectory and the concave obstacle located on one of the at least one intersection curve, a first normal vector of a first convex obstacle and a second normal vector of a second convex obstacle will be determined, and the one of the at least one intersection curve is formed between the first convex obstacle and the second convex obstacle; a modal matrix corresponding to the intersection will be constructed using the first normal vector and the second normal vector, and the initial DS model motion trajectory will be corrected using the modal matrix corresponding to the intersection.

Figure 5:
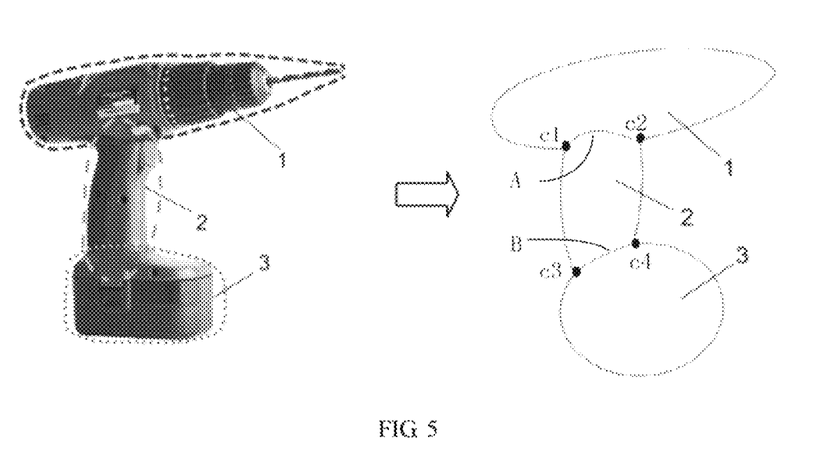
FIG. 5 is a schematic diagram of a concave obstacle according to one embodiment.

In order to better understand the embodiment above, an exemplary concave obstacle is illustrated in FIG. 5. The concave obstacle is a power drill and composed of three convex obstacles 1, 2, and 3. The convex obstacle 1 and convex obstacle 2 intersect each other, forming an intersection curve A. The convex obstacle 2 and convex obstacle 3 intersect each other, forming an intersection curve B. A portion of the intersection curve A shown in FIG. 5 extends from point c1 to point c2, and a portion of the intersection curve B shown in FIG. 5 extends from point c3 to point c4. It should be noted that any concave obstacle can be divided into multiple convex obstacles.

In one embodiment, the combined modal matrix of the three convex obstacles can be calculated according to the following equation:

$$\overline{M}(\xi) = \prod_{i=1}^{N} M_i(\tilde{\xi}_i),$$

where $$M_i(\tilde{\xi}_i) = E_i(\tilde{\xi}_i) D_i(\tilde{\xi}_i) E_i(\tilde{\xi}_i)^{(-1)},$$

-continued
$$E_i(\xi_i) = [\, n_i(\xi_i) \quad e_i^1(\xi_i) \quad e_i^2(\xi_i) \,],$$

and $$D_i(\xi_i) = \begin{bmatrix} \lambda_i^1(\xi_i) & 0 & 0 \\ 0 & \lambda_i^2(\xi_i) & 0 \\ 0 & 0 & \lambda_i^3(\xi_i) \end{bmatrix}, \overline{M}(\xi)$$

represents the combined modal matrix of N convex obstacles, $M_i(\xi_i)$ represents the modal matrix of the i-th convex obstacle, $$n_i = (\xi_i) \left[ \frac{\partial \Gamma_i(\xi_i)}{\partial (\xi)_1} \quad \frac{\partial \Gamma_i(\xi_i)}{\partial (\xi)_2} \quad \frac{\partial \Gamma_i(\xi_i)}{\partial (\xi)_3} \right]^T$$

represents the normal vector of the i-th convex obstacle, $e_i^1(\xi_i)$ and $e_i^2(\xi_i)$ represent the base vectors of the hyperplane corresponding to the normal vector of the i-th convex obstacle.

In one embodiment, $$\lambda_i^1(\xi_i) = 1 - \frac{\omega_i(\xi_i)}{|\Gamma_i(\xi_i)|},$$

$$\lambda_i^2(\xi_i) = \lambda_i^3(\xi_i) = 1 + \frac{\omega_i(\xi_i)}{|\Gamma_i(\xi_i)|}, \text{ and}$$

$$\omega_i(\xi_i) = \prod_{j=1, j \neq i}^{N} \frac{(\Gamma_j(\xi_j) - 1)}{(\Gamma_i(\xi_i) - 1) + (\Gamma_j(\xi_j) - 1)},$$

where $\Gamma_i(\xi_i)$ represents the surface function of the i-th convex obstacle, $(\xi)_1$, $(\xi)_2$, and $(\xi)_3$ represent the x-axis, y-axis and z-axis of a Cartesian coordinate system.

After obtaining the combined modal matrix of the multiple convex obstacles, it will be further determined whether the intersection of the initial DS model motion trajectory and the concave obstacle located on one of the at least one intersection curve (e.g., intersection curves A and B of FIG. 5).

In one embodiment, if the intersection of the initial DS model motion trajectory and the concave obstacle is not located on one of the at least one intersection curve, the initial DS model motion trajectory will be corrected using the combined modal matrix according to the following equation:

$$\dot{\xi} = \overline{M}(\xi) f(\xi),$$

where $\dot{\xi}$ represents the motion trajectory after obstacle correction is performed on the initial DS model motion trajectory, $\overline{M}(\xi)$ represents the combined modal matrix of N convex obstacles, $f(\xi)$ represents the initial DS model motion trajectory.

Figure 6:
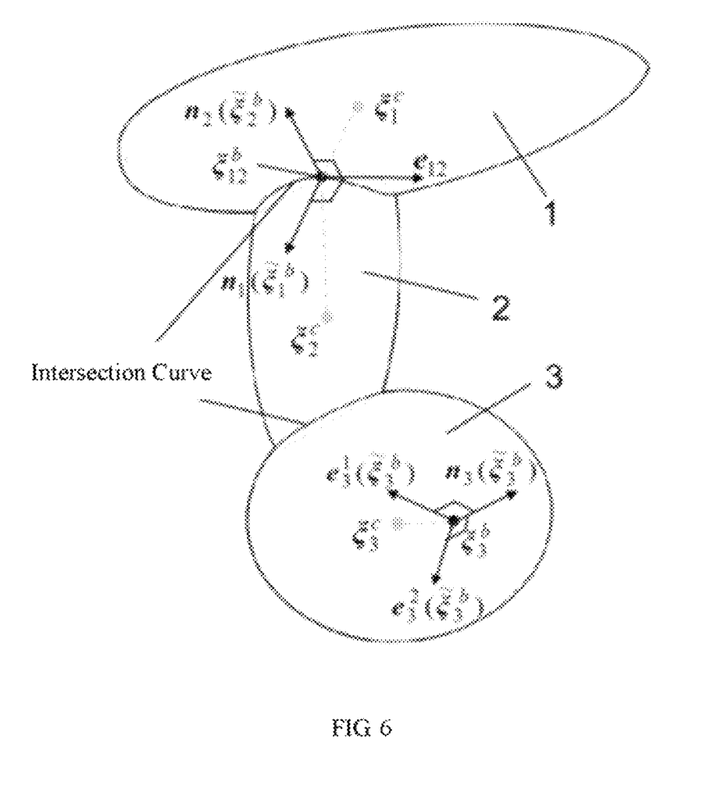
FIG. 6 is a schematic diagram of the concave obstacle according to one embodiment.

Referring to FIG. 6, $\xi_1^c$ represents the center point of convex obstacle 1, $\xi_2^c$ represents the center point of convex obstacle 2, and $\xi_2^c$ represents the center point of convex obstacle 3. $\xi_3^b$ represents the intersection of the initial DS model motion trajectory and the concave obstacle, which is located on the surface of the convex obstacle 3. $n_3(\xi_3^b)$ represents the normal vector of the third convex obstacle, and $e_3^1(\xi_3^b)$ and $e_3^2(\xi_3^b)$ represent the base vectors of the hyperplane corresponding to the normal vector of the convex obstacle 3.

In response to an intersection of the initial DS model motion trajectory and the concave obstacle located on one of the at least one intersection curve, the first normal vector of the first convex obstacle and a second normal vector of a second convex obstacle will be determined, the one of the at least one intersection curve is formed between the first convex obstacle and the second convex obstacle; the modal matrix corresponding to the intersection will be constructed using the first normal vector and the second normal vector, and the initial DS model motion trajectory will be corrected using the modal matrix corresponding to the intersection. In this way, the concave obstacle can be avoided.

In the case of the intersection $\xi_{mn}^b$ of the initial DS model motion trajectory and the concave obstacle located on the intersection curve formed by the m-th and n-th convex obstacles, the first normal vector of the intersection $\xi_{mn}^b$ at the m-th convex obstacle (i.e., the first normal vector at the first convex obstacle) is expressed as follows:

$$n_m(\xi_m^b) = \left[ \frac{\partial \Gamma_m(\xi_m^b)}{\partial (\xi)_1} \quad \frac{\partial \Gamma_m(\xi_m^b)}{\partial (\xi)_2} \quad \frac{\partial \Gamma_m(\xi_m^b)}{\partial (\xi)_3} \right]^T \text{ and}$$

$$\xi_m^b = \xi_{mn}^b - \xi_m^c, \text{ where } n_m(\xi_m^b)$$

represents the first normal vector, $\xi_{mn}^b$ represents the coordinates of the intersection, $\xi_m^c$ represents the coordinates of the center point of the m-th convex obstacle, $\tau_m(\xi_m^b)$ represents the surface function of the m-th convex obstacle, and b represents the sign of a point on the intersection curve formed by the m-th convex obstacle and the n-th convex obstacle.

In one embodiment, the second normal vector of the intersection $\xi_{mn}^b$ at the n-th convex obstacle (i.e., the second normal vector at the second convex obstacle) is expressed as follows:

$$n_n(\xi_n^b) = \left[ \frac{\partial \Gamma_n(\xi_n^b)}{\partial (\xi)_1} \quad \frac{\partial \Gamma_n(\xi_n^b)}{\partial (\xi)_2} \quad \frac{\partial \Gamma_n(\xi_n^b)}{\partial (\xi)_3} \right]^T \text{ and}$$

$$\xi_n^b = \xi_{mn}^b - \xi_n^c, n_n(\xi_n^b)$$

represents the second normal vector, $\xi_{mn}^b$ represents the coordinates of the intersection, $\xi_n^c$ represents the coordinates of the center point of the n-th convex obstacle, $\tau n(\xi_n^b)$ represents the surface function of the n-th convex obstacle, and b represents the sign of a point on the intersection curve formed by the m-th convex obstacle and the n-th convex obstacle.

After the above-mentioned first normal vector and second normal vector are obtained, the modal matrix $M_{mn}(\xi_{mn}^b)$ corresponding to the intersection $\xi_{mn}^b$ is constructed based on the first normal vector and the second normal vector as follows:

$$M_{mn}(\xi_{mn}^b) = E_{mn}(\xi_m^b) D_{mn}(\xi_m^b) pinv(E_{mn}(\xi_m^b)),$$

where $$E_{mn}(\xi_{mn}^b) = \lfloor n_m(\xi_{mn}^b) \ e_{mn}(\xi_{mn}^b) \rfloor,$$

$$D_{mn}(\xi_m^b) = \begin{bmatrix} \lambda_m^1(\xi_m^b) & 0 \\ 0 & \lambda_m^2(\xi_m^b) \end{bmatrix},$$

$$\lambda_m^1(\xi_m^b) = 1 - \frac{1}{|\Gamma_m(\xi_m^b)|},$$

$$\lambda_m^2(\xi_m^b) = 1 + \frac{1}{|\Gamma_m(\xi_m^b)|},$$

$$e_{mn}(\xi_{mn}^b) = n_m(\xi_m^b) \times n_n(\xi_n^b),$$

pin represents a pseudo-inverse matrix, and $e_{mn}(\xi_{mn}^b)$ represents a vector perpendicular to the first normal vector and the second normal vector. By constructing the modal matrix, when the initial motion trajectory is corrected for obstacle avoidance, the corrected desired motion trajectory can shift along the tangent lines of the normal vectors of the surfaces of the first obstacle and the second obstacle, thereby achieving obstacle avoidance.

After the modal matrix $M_{mn}(\xi_{mn}^b)$ corresponding to the intersection $\xi_{mn}^b$ is obtained, the modal matrix will be used to correct the initial DS model motion trajectory of the, and the motion trajectory after the obstacle avoidance correction is obtained as follows:

$$\dot{\xi} = M_{mn}(\xi_{mn}^b) f(\xi),$$

$f(\xi)$ represents the initial motion where trajectory, $M_{mn}(\xi_{mn}^b)$ represents the desired modal matrix determined based on the intersection $\xi_{mn}^b$, and $\dot{\xi}$ represents the desired motion trajectory after the obstacle avoidance correction.

Referring to FIG. 6, $\xi_1^c$ represents the center point of convex obstacle 1, $\xi_1^c$ represents the center point of convex obstacle 2, and $\xi_2^c$ represents the center point of convex obstacle 3. $\xi_{12}^b$ represents a point on the intersection curve formed by the convex obstacle 1 and convex obstacle 2, and is the above-mentioned intersection, $n_1(\xi_1^b)$ represents the normal vector of the point $\xi_{12}^b$ on the first convex obstacle, $n_2(\xi_2^b)$ represents the normal vector of the point $\xi_{12}^b$ on the second convex obstacle, $e_{12}$ represents a vector perpendicular to the normal vectors $n_1(\xi_1^b)$ and $n_2(\xi_2^b)$, which is the value of $E_{mn}(\xi_m^b)$.

It should be noted that if there is no need to correct the pose of the target object after the obstacle avoidance correction, the motion trajectory after the obstacle avoidance correction is the desired motion trajectory. If there is a need to correct the pose of the target object after the obstacle avoidance correction, the pose of the target object is corrected, and the corrected motion trajectory will be used as the desired motion trajectory.

In one embodiment, the manner of correcting the pose of the target object is to replace the pose of the target object with the first pose of the target task object.

Based on the environmental data and command instructions, it can be effectively determined whether an obstacle avoidance correction and a pose correction of the target task object are needed. When obstacle avoidance correction is needed, if the obstacle is a concave obstacle, the concave obstacle will be divided into multiple convex obstacles. Based on whether the intersection of the initial DS model motion trajectory and the concave obstacle is located on an intersection curve, different modal matrices are constructed to correct the initial DS model motion trajectory so that obstacle avoidance can be effectively realized. When the pose of the target object needs to be corrected, the pose of the target object will also be corrected. With the method above, the corrected target motion trajectory is more in line with the task requirements in the actual scenarios, so that the task can be effectively and accurately performed.

The method in the embodiments of the present disclosure is suitable for application scenarios such as elderly care, assistance for people in need, family services, human-machine collaboration, etc., which enables the robotic manipulator to plan the motion trajectory autonomously and flexibly. By tracking and controlling the determined target motion trajectory, the robotic manipulator can achieve precise control, effectively and accurately complete the desired tasks, and realize the human-like autonomous movement. It should be noted that the above-mentioned planning process of the motion trajectory is a real-time process, and real-time planning of the motion trajectory can also be realized.

In one embodiment, a motion trajectory planning device for a robotic manipulator may include a processor, a storage, and computer programs stored in the storage. The computer programs, when being executed by the processor, cause the motion trajectory planning device to perform processing including: in response to the robotic manipulator receiving a command instruction, obtaining environmental data collected by the visual inspection system; determining an initial DS model motion trajectory of the robotic manipulator according to the command instruction, the environmental data, and a preset teaching motion DS model library, wherein the teaching motion DS model library comprises at least one DS model motion trajectory generated based on human teaching activities; and at least based on a result of determining whether there is an obstacle, whose pose is on the initial DS model motion trajectory, in a first object included in the environmental data, correcting the initial DS model motion trajectory to obtain a desired motion trajectory of the robotic manipulator; wherein an obstacle avoidance correction is performed on initial DS model motion trajectory in response to there being the obstacle in the first object included in the environmental data.

In the embodiments of the present disclosure, based on human teaching activities, DS model motion trajectories can be generated, and the teaching motion DS model library can be created, which allows the robotic manipulator to determine the initial DS model motion trajectory based on the teaching motion DS model library. The initial DS model motion trajectory may be corrected to obtain the desired motion trajectory that meets the requirements of the command instruction, thereby realizing the autonomous and flexible motion trajectory planning of the manipulator.

For concepts, explanations, and detailed descriptions related to the technical solution provided by this embodiment of the present disclosure, used in the device, refer to descriptions about the content in the foregoing method or other embodiments. Details are not described again herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented motion trajectory planning method for a robotic manipulator that comprises a visual inspection system, comprising:
   in response to the robotic manipulator receiving a command instruction, obtaining environmental data collected by the visual inspection system;
   determining an initial DS model motion trajectory of the robotic manipulator according to the command instruction, the environmental data, and a preset teaching motion DS model library, wherein the teaching motion DS model library comprises at least one DS model motion trajectory generated based on human teaching activities; and
   at least based on a result of determining whether there is an obstacle, whose pose is on the initial DS model motion trajectory, in a first object included in the environmental data, correcting the initial DS model motion trajectory to obtain a desired motion trajectory of the robotic manipulator; wherein an obstacle avoidance correction is performed on initial DS model motion trajectory in response to there being the obstacle in the first object included in the environmental data;
   wherein the obstacle avoidance correction performed on initial DS model motion trajectory comprises:
   in response to the obstacle being a concave obstacle, dividing the concave obstacle into at least two convex obstacles that intersect each other, wherein at least one intersection curve is formed between the at least two convex obstacles intersecting each other;

in response to an intersection of the initial DS model motion trajectory and the concave obstacle not located on the at least one intersection curve, calculating a combined modal matrix formed by the at least two convex obstacles, and correcting the initial DS model motion trajectory using the combined modal matrix.

2. The method of claim 1, wherein determining the initial DS model motion trajectory of the robotic manipulator comprises:

analyzing the command instruction to determine a task name and a target task object indicated by the command instruction, wherein the target task object is an object manipulated by the robotic manipulator when the command instruction is executed;

performing object recognition on the environmental to determine a first object included in the environmental data; and determining the initial DS model motion trajectory of the robotic manipulator according to the task name, the target task object, the first object, and the teaching motion DS model library.

3. The method of claim 2, wherein the teaching motion DS model library comprises relationships between the task name, the task object, and the initial DS model motion trajectory; determining the initial DS model motion trajectory of the robotic manipulator according to the task name, the target task object, the first object, and the teaching motion DS model library comprises:

determining whether the first object comprises the target task object; and in response to the first object comprising the target task object, searching in the teaching motion DS model library using the task name and the target task object as keywords to determine the initial DS model motion trajectory of the robotic manipulator associated with the task name and the target task object.

4. The method of claim 1, wherein correcting the initial DS model motion trajectory to obtain the desired motion trajectory of the robotic manipulator comprises:

obtaining a first result by checking whether there is the obstacle, whose pose is on the initial DS model motion trajectory, in the first object included in the environmental data, and obtaining a second result by checking whether a first pose of a target task object indicated by the command instruction and a second pose of a target object in the initial DS model motion trajectory are identical; and correcting the initial DS model motion trajectory to obtain the desired motion trajectory of the robotic manipulator according to the first result and the second result.

5. The method of claim 4, wherein correcting the initial DS model motion trajectory to obtain the desired motion trajectory of the robotic manipulator according to the first result and the second result comprises:

in response to there being the obstacle in the first object included in the environmental data and the first pose and the second pose being identical, performing the obstacle avoidance correction on initial DS model motion trajectory to obtain the desired motion trajectory of the robotic manipulator;

in response to there being the obstacle in the first object included in the environmental data and the first pose and the second pose not being identical, performing the obstacle avoidance correction on initial DS model motion trajectory, performing correction of the second pose of the target object on the initial DS model motion trajectory after the obstacle avoidance correction based on the first pose;

in response to there not being the obstacle in the first object included in the environmental data and the first pose and the second pose being identical, determining the initial DS model motion trajectory of the robotic manipulator as the desired motion trajectory of the robotic manipulator; and in response to there not being the obstacle in the first object included in the environmental data and the first pose and the second pose not being identical, perform correction of the second pose of the target object on the initial DS model motion trajectory based on the first pose.

6. The method of claim 1, further comprising:

in response to an intersection of the initial DS model motion trajectory and the concave obstacle located on one of the at least one intersection curve, determining a first normal vector of a first convex obstacle and a second normal vector of a second convex obstacle, wherein the one of the at least one intersection curve is formed between the first convex obstacle and the second convex obstacle;

constructing a modal matrix corresponding to the intersection using the first normal vector and the second normal vector; and correcting the initial DS model motion trajectory using the modal matrix corresponding to the intersection.

7. A robotic manipulator, comprising:

a visual inspection system one or more processors;

a memory; and one or more programs, wherein the one or more programs are stored in the memory and configured to be executed by the one or more processors, the one or more programs comprise:

instructions for, in response to the robotic manipulator receiving a command instruction, obtaining environmental data collected by the visual inspection system;

instructions for determining an initial DS model motion trajectory of the robotic manipulator according to the command instruction, the environmental data, and a preset teaching motion DS model library, wherein the teaching motion DS model library comprises at least one DS model motion trajectory generated based on human teaching activities; and instructions for at least based on a result of determining whether there is an obstacle, whose pose is on the initial DS model motion trajectory, in a first object included in the environmental data, correcting the initial DS model motion trajectory to obtain a desired motion trajectory of the robotic manipulator; wherein an obstacle avoidance correction is performed on initial DS model motion trajectory in response to there being the obstacle in the first object included in the environmental data;

wherein the obstacle avoidance correction performed on initial DS model motion trajectory comprises:

in response to the obstacle being a concave obstacle, dividing the concave obstacle into at least two convex obstacles that intersect each other, wherein at least one intersection curve is formed between the at least two convex obstacles intersecting each other;

in response to an intersection of the initial DS model motion trajectory and the concave obstacle not located on the at least one intersection curve, calculating a combined modal matrix formed by the at least two convex obstacles, and correcting the initial DS model motion trajectory using the combined modal matrix.

8. The robotic manipulator of claim 7, wherein the instructions for determining the initial DS model motion trajectory of the robotic manipulator comprise:
   instructions for analyzing the command instruction to determine a task name and a target task object indicated by the command instruction, wherein the target task object is an object manipulated by the robotic manipulator when the command instruction is executed;
   instructions for performing object recognition on the environmental to determine a first object included in the environmental data; and
   instructions for determining the initial DS model motion trajectory of the robotic manipulator according to the task name, the target task object, the first object, and the teaching motion DS model library.

9. The robotic manipulator of claim 8, wherein the teaching motion DS model library comprises relationships between the task name, the task object, and the initial DS model motion trajectory; the instructions for determining the initial DS model motion trajectory of the robotic manipulator according to the task name, the target task object, the first object, and the teaching motion DS model library comprise:
   instructions for determining whether the first object comprises the target task object; and
   instructions for, in response to the first object comprising the target task object, searching in the teaching motion DS model library using the task name and the target task object as keywords to determine the initial DS model motion trajectory of the robotic manipulator associated with the task name and the target task object.

10. The robotic manipulator of claim 7, wherein the instructions for correcting the initial DS model motion trajectory to obtain the desired motion trajectory of the robotic manipulator comprise:
    instructions for obtaining a first result by checking whether there is the obstacle, whose pose is on the initial DS model motion trajectory, in the first object included in the environmental data, and obtaining a second result by checking whether a first pose of a target task object indicated by the command instruction and a second pose of a target object in the initial DS model motion trajectory are identical; and
    instructions for correcting the initial DS model motion trajectory to obtain the desired motion trajectory of the robotic manipulator according to the first result and the second result.

11. The robotic manipulator of claim 10, wherein the instructions for correcting the initial DS model motion trajectory to obtain the desired motion trajectory of the robotic manipulator according to the first result and the second result comprise:
    instructions for, in response to there being the obstacle in the first object included in the environmental data and the first pose and the second pose being identical, performing the obstacle avoidance correction on initial DS model motion trajectory to obtain the desired motion trajectory of the robotic manipulator;
    instructions for, in response to there being the obstacle in the first object included in the environmental data and the first pose and the second pose not being identical, performing the obstacle avoidance correction on initial DS model motion trajectory, performing correction of the second pose of the target object on the initial DS model motion trajectory after the obstacle avoidance correction based on the first pose;
    instructions for, in response to there not being the obstacle in the first object included in the environmental data and the first pose and the second pose being identical, determining the initial DS model motion trajectory of the robotic manipulator as the desired motion trajectory of the robotic manipulator; and
    instructions for, in response to there not being the obstacle in the first object included in the environmental data and the first pose and the second pose not being identical, perform correction of the second pose of the target object on the initial DS model motion trajectory based on the first pose.

12. The robotic manipulator of claim 7, wherein the one or more programs further comprise:
    instructions for, in response to an intersection of the initial DS model motion trajectory and the concave obstacle located on one of the at least one intersection curve, determining a first normal vector of a first convex obstacle and a second normal vector of a second convex obstacle, wherein the one of the at least one intersection curve is formed between the first convex obstacle and the second convex obstacle;
    instructions for constructing a modal matrix corresponding to the intersection using the first normal vector and the second normal vector; and
    instructions for correcting the initial DS model motion trajectory using the modal matrix corresponding to the intersection.

13. A non-transitory computer-readable storage medium storing one or more programs to be executed in a motion trajectory planning device for a robotic manipulator having a visual inspection system, the one or more programs, when being executed by one or more processors of the gesture recognition device, causing the motion trajectory planning device to perform processing comprising:
    in response to the robotic manipulator receiving a command instruction, obtaining environmental data collected by the visual inspection system;
    determining an initial DS model motion trajectory of the robotic manipulator according to the command instruction, the environmental data, and a preset teaching motion DS model library, wherein the teaching motion DS model library comprises at least one DS model motion trajectory generated based on human teaching activities; and
    at least based on a result of determining whether there is an obstacle, whose pose is on the initial DS model motion trajectory, in a first object included in the environmental data, correcting the initial DS model motion trajectory to obtain a desired motion trajectory of the robotic manipulator; wherein an obstacle avoidance correction is performed on initial DS model motion trajectory in response to there being the obstacle in the first object included in the environmental data;
    wherein the obstacle avoidance correction performed on initial DS model motion trajectory comprises:
    in response to the obstacle being a concave obstacle, dividing the concave obstacle into at least two convex obstacles that intersect each other, wherein at least one intersection curve is formed between the at least two convex obstacles intersecting each other;

in response to an intersection of the initial DS model motion trajectory and the concave obstacle not located on the at least one intersection curve, calculating a combined modal matrix formed by the at least two convex obstacles, and correcting the initial DS model motion trajectory using the combined modal matrix.

14. The non-transitory computer-readable storage medium of claim 13, wherein determining the initial DS model motion trajectory of the robotic manipulator comprises:

analyzing the command instruction to determine a task name and a target task object indicated by the command instruction, wherein the target task object is an object manipulated by the robotic manipulator when the command instruction is executed;

performing object recognition on the environmental to determine a first object included in the environmental data; and determining the initial DS model motion trajectory of the robotic manipulator according to the task name, the target task object, the first object, and the teaching motion DS model library.

15. The non-transitory computer-readable storage medium of claim 14, wherein the teaching motion DS model library comprises relationships between the task name, the task object, and the initial DS model motion trajectory; determining the initial DS model motion trajectory of the robotic manipulator according to the task name, the target task object, the first object, and the teaching motion DS model library comprises:

determining whether the first object comprises the target task object; and in response to the first object comprising the target task object, searching in the teaching motion DS model library using the task name and the target task object as keywords to determine the initial DS model motion trajectory of the robotic manipulator associated with the task name and the target task object.

16. The non-transitory computer-readable storage medium of claim 13, wherein correcting the initial DS model motion trajectory to obtain the desired motion trajectory of the robotic manipulator comprises:

obtaining a first result by checking whether there is the obstacle, whose pose is on the initial DS model motion trajectory, in the first object included in the environmental data, and obtaining a second result by checking whether a first pose of a target task object indicated by the command instruction and a second pose of a target object in the initial DS model motion trajectory are identical; and correcting the initial DS model motion trajectory to obtain the desired motion trajectory of the robotic manipulator according to the first result and the second result.

17. The non-transitory computer-readable storage medium of claim 16, wherein correcting the initial DS model motion trajectory to obtain the desired motion trajectory of the robotic manipulator according to the first result and the second result comprises:

in response to there being the obstacle in the first object included in the environmental data and the first pose and the second pose being identical, performing the obstacle avoidance correction on initial DS model motion trajectory to obtain the desired motion trajectory of the robotic manipulator;

in response to there being the obstacle in the first object included in the environmental data and the first pose and the second pose not being identical, performing the obstacle avoidance correction on initial DS model motion trajectory, performing correction of the second pose of the target object on the initial DS model motion trajectory after the obstacle avoidance correction based on the first pose;

in response to there not being the obstacle in the first object included in the environmental data and the first pose and the second pose being identical, determining the initial DS model motion trajectory of the robotic manipulator as the desired motion trajectory of the robotic manipulator; and in response to there not being the obstacle in the first object included in the environmental data and the first pose and the second pose not being identical, perform correction of the second pose of the target object on the initial DS model motion trajectory based on the first pose.

18. The non-transitory computer-readable storage medium of claim 13, wherein the processing further comprises:

in response to an intersection of the initial DS model motion trajectory and the concave obstacle located on one of the at least one intersection curve, determining a first normal vector of a first convex obstacle and a second normal vector of a second convex obstacle, wherein the one of the at least one intersection curve is formed between the first convex obstacle and the second convex obstacle;

constructing a modal matrix corresponding to the intersection using the first normal vector and the second normal vector; and correcting the initial DS model motion trajectory using the modal matrix corresponding to the intersection.

19. The non-transitory computer-readable storage medium of claim 13, wherein a DS model motion trajectory in the teaching motion DS model library is obtained by:

obtaining video data of human teaching activities corresponding to a task, and processing the video data to obtain a DS model motion trajectory corresponding to the task using a Gaussian mixture model; and setting a task name and a task object of the DS model motion trajectory corresponding to the task based on analysis of the task.

20. The non-transitory computer-readable storage medium of claim 13, wherein the command instruction is voice or non-voice command instruction.

* * * * *